United States Patent

[11] 3,575,051

[72] Inventor Harry F. Moore
Hilltown, Pa.
[21] Appl. No. 733,128
[22] Filed May 29, 1968
[45] Patented Apr. 13, 1971
[73] Assignee Emerson Electric Co.,
St. Louis County, Mo.

[54] MAGNETIC FLOW METER
10 Claims, 3 Drawing Figs.
[52] U.S. Cl. ................................................ 73/194EM
[51] Int. Cl. ................................................ G01p 5/08
[50] Field of Search ...................................... 73/194;
330/149

[56] References Cited
UNITED STATES PATENTS
2,575,364 11/1951 Sink ............................. 330/149X
2,696,737 12/1954 Mittelmann .................. 73/194
3,094,870 6/1963 Mittelmann .................. 73/194
3,377,855 4/1968 Coia et al. .................... 73/194
3,449,951 6/1969 Westersten ................... 73/194

Primary Examiner—Charles A. Ruehl
Attorney—Philip B. Polster

ABSTRACT: A magnetic flow meter primary unit including a conduit for fluid, electromagnets positioned to form a magnetic field through and at right angles to the conduit, and electrodes perpendicular to the magnetic field for picking up the voltage generated by the flow of fluid through the conduit. The electromagnets are fed by a source of alternating current. Reference coils located adjacent the electromagnetic coils supply a reference voltage output. The electrodes supply a signal output. Within the flow meter primary, the two sides of the signal output are electrically connected to the fixed plates of a variable differential capacitor, and the reference output is electrically connected to the movable plate of the differential capacitor, thereby permitting cancellation of unwanted in-phase errors in the signal output.

Patented April 13, 1971

3,575,051

Inventor
HARRY F. MOORE
By
Attorney

MAGNETIC FLOW METER

BACKGROUND OF THE INVENTION

Alternating current magnetic flow meters are conventionally made in two parts: a primary unit or flow head and a secondary unit.

The primary includes a section of conduit designed to mate with the conduit through which the fluid to be measured flows. An electromagnet, supplied by an alternating current, forms a magnetic field normal to the axis of the section of conduit. A pair of electrodes are located on an axis normal to the magnetic field, to detect the potential created by the flow of fluid through the field. These electrodes, which are designated active electrodes, are electrically connected mediately or immediately to a flow signal output to the secondary unit. A reference voltage output to the secondary unit is also provided, electrically connected mediately or immediately to the secondary winding of a transformer, the primary winding of which carries a potential in phase with that of the electromagnet. The primary winding of this transformer is conveniently in series with the electromagnetic coil or coils, or the coils themselves may be used as the primary windings for this transformer.

The secondary unit is essentially a differential amplifier for comparing the reference voltage output of the primary with the flow signal output of the primary and supplying its own output, generally in terms of rate or volume of flow.

Although the primary unit must necessarily be made of different sizes for different conduit sizes, the secondary unit is conveniently and conventionally a standard unit for use with a variety of primaries. Therefore, the primaries are designed to provide a standardized output. This is accomplished partially by carefully adjusting the reference voltage and flow signal voltage ratio to the same value on each primary. However, the strong magnetic flux in the primary, wiring proximity, slight asymmetries in construction, improper grounding in installation and the weakness of the flow signal output lead to severe problems with unwanted signals in both no flow and flow conditions. Because it is desirable for the secondary unit to be usable with any primary without recalibrating the secondary, these unwanted signals must be eliminated at the primary.

Presently known methods for rejecting the quadrature component of unwanted signals at the primary have proven satisfactory. Elimination of in-phase signals has proven more difficult. One method frequently employed is to move the leads around in the magnetic field until the unwanted signals are effectively eliminated, and then to anchor the leads carefully in these positions. A second frequently employed method consists of mounting angularly shaped nonmagnetic metal segments known as flags, in the magnetic field adjacent the electrodes. The flags are rotated until a position is found in which the magnetic field is distorted sufficiently to cancel the unwanted in-phase signals. The disadvantages of these methods include their sensitivity to mechanical shock or temperature change, the difficulty or impossibility of making adjustments once the primary has been installed, and the cost of mounting hardware. Eddy current losses in the flags produce additional heat in the primary when flags are used.

One of the objects of this invention is to provide a means for rejecting unwanted in-phase signals in the primary unit of a magnetic flow meter which is inexpensive, adjustable in the field, and relatively unaffected by temperature and vibration.

Another object is to provide such a means which is compact enough to be used in fractional size primaries.

Another object is to provide such a means which provides infinite fine adjustment for precise zeroing of the flow meter.

Another object is to provide such a means which provides a substantially more stable output at zero flow than meters known heretofore.

Other objects will become apparent to those skilled in the art in the light of the following description and accompanying drawing.

SUMMARY OF THE INVENTION

In accordance with this invention, generally stated, in a flow meter having a primary unit and a secondary unit, a primary unit is provided having a conduit for flowing fluid, an electromagnet fed by a source of alternating current, the electromagnet being adapted to form a magnetic field perpendicular to the axis of the conduit, a pair of electrodes perpendicular to the magnetic field, the electrodes being electrically connected to a flow signal output, a reference voltage output, the reference voltage output being electrically connected to the secondary of a transformer, the potential of the primary of the transformer being in phase with that feeding the electromagnet, and a capacitor, one plate of the capacitor being electrically connected to the reference voltage output and another plate of the capacitor being electrically connected to one side of the flow signal output.

In the preferred embodiment the capacitor is a variable differential capacitor having one fixed plate electrically connected to the flow signal output from one electrode, the other fixed plate electrically connected to the flow signal output from the other electrode and the movable plate electrically connected to the reference voltage output.

In another embodiment a fixed value capacitor is electrically connected between the reference voltage output and the flow signal output from one of the electrodes and a variable capacitor is electrically connected between the reference voltage output and the flow signal output from the other electrode.

In still another embodiment, two fixed value capacitors, experimentally chosen to minimize in-phase signal errors, are electrically connected between the reference voltage output and the flow signal outputs from the electrodes.

DESCRIPTION OF THE PREFERRED EMBODIMENTS

Figure 1:
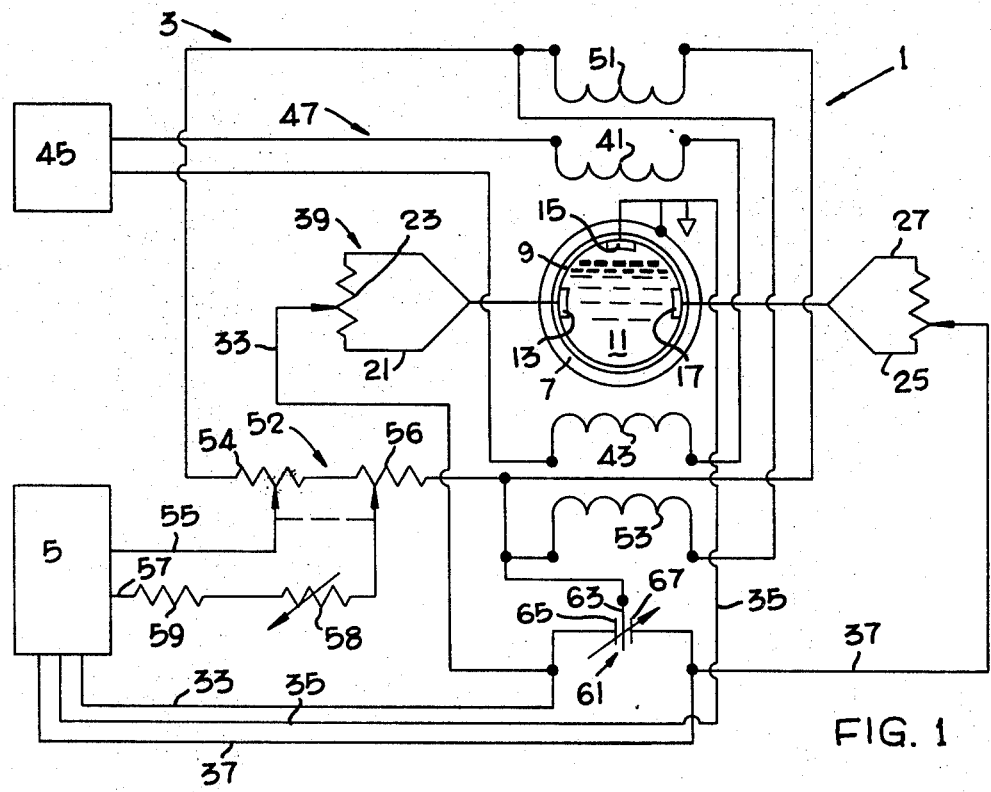
FIG. 1 is a circuit diagram of one illustrative embodiment of flow meter of this invention.

Referring now to the drawings, and in particular to FIG. 1, reference numeral 1 indicates one illustrative embodiment of flow meter of this invention, having a primary unit 3 and a secondary unit 5. The primary unit 3 includes a conduit or tube 7 having an insulative lining 9. The tube and liner are made of conventional materials, for example stainless steel and glass respectively. The tube 7 is adapted to be filled with a fluid 11 when the primary is put into operation. Extending through the tube 7 to its interior, so as to be in contact with the fluid 11, are three electrodes 13, 15 and 17 positioned 90° apart. The central electrode 15 is electrically connected to the tube 7 and to a grounded flow signal output line 35 which acts as a ground reference for the flow signal output. The opposing electrodes 13 and 17 are insulated from the tube 7 and are electrically connected through electrode loops 21 and 25 respectively to potentiometers 23 and 27 respectively. The wipers of the potentiometers 23 and 27 are electrically connected to flow signal output lines 33 and 37 respectively and, with the ground reference line 35, form a flow signal output circuit 39.

A pair of electromagnetic coils 41 and 43 are positioned on either side of the tube 7 with their centers lying along an axis perpendicular both to the axis of the tube 7 and to an axis through the centers of the active electrodes 13 and 17. The electromagnetic coils 41 and 43 are electrically connected in series to a standard alternating current source 45, to form an activating circuit 47.

A pair of reference windings 51 and 53 are placed adjacent the magnetic coils 41 and 43 respectively and act as the secondary windings of a transformer of which the coils 41 and 43 are the primary windings. The reference windings 51 and 53 are connected in parallel and form part of a reference voltage output circuit 52. The reference voltage output circuit 52 includes a pair of ganged potentiometers 54 and 56 corresponding sides of which are connected electrically. The potentiometers 54 and 56 thus act as a different voltage divider. The wipers of the potentiometers 54 and 56 are electrically connected respectively to an output lead 55 and, through a variable resistor 58 and a fixed resistor 59, to an output lead 57. The output leads 55 and 57 provide a reference voltage to the secondary of the flow meter. The potentiometers 54 and 56 and the variable resistor 58 provide amplitude and phase adjustments for the reference voltage output.

The reference voltage output circuit 52 and the flow signal output circuit 39 are electrically connected to the secondary 5, which may be a standard signal converter such as those sold commercially by Brooks Instrument Division of Emerson Electric Co. as series 7400 Signal Converters.

The flow meter thus far described is a standard one.

In the flow primary, a differential capacitor 61 is provided which includes a movable element 63 and a pair of fixed plates 65 and 67. The movable element 63 of the capacitor 61 is electrically connected to the reference voltage output circuit 52, so as to impose on the element 63 a properly phased outside source signal. The fixed plates 65 and 67 of the differential capacitor are electrically connected respectively to the leads 33 and 37 of the flow signal output circuit 39.

It will be seen that by adjusting the movable element, a small amount of in-phase signal can be directed to either active electrode for cancellation of an unwanted in-phase signal.

It will also be seen that the control for the differential capacitor 61 may extend through the casing of the primary, and that it may thus be used to cancel out unwanted in-phase signals arising from faulty installation, such as improper grounding. A further advantage is that the same size capacitor may be used in primaries of different sizes. It has also been found that the capacitor 61 provides a considerably more stable no-flow output than previously known methods of cancelling unwanted in-phase signals.

Merely by way of illustration, if the diameter of the tube 7 is 6 inches, the electrical input to the activating circuit is a 60 cycle, single phase, 115 volt source, and output is to be nominally 0.6 volts per foot per second, the components of the primary may have the following values:

| | |
|---|---|
| potentiometers 23 and 27 | 1000 ohms |
| potentiometers 54 and 56 | 2500 ohms |
| variable resistor 58 | 250 ohms |
| resistor 59 | 1750 ohms |
| capacitor 61 | 2.3 pf. typical capacitance crossover |

The capacitance range of 4.6± pf. of the differential capacitor 61 represents an impedance of approximately 1,000 megohms minimum at 60 cycles. It therefore may replace the flags of existing primaries without affecting the calibration of the primary.

Figure 2:
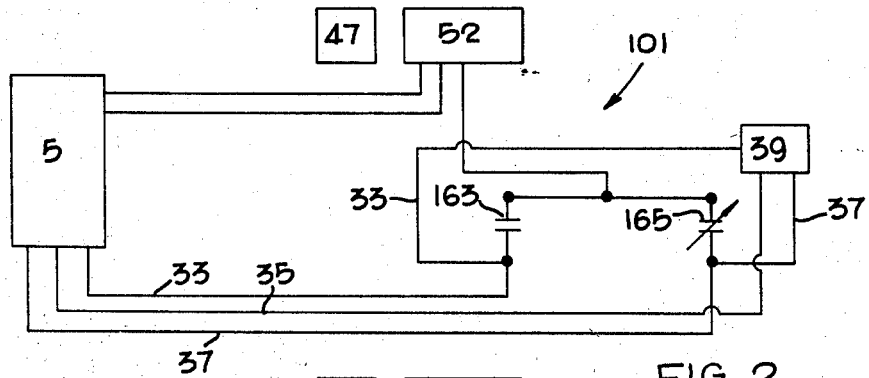
FIG. 2 is a circuit diagram of another illustrative embodiment of flow meter of this invention.

A second illustrative embodiment of flow meter is shown in FIG. 2. This flow meter 101 is identical with that shown in FIG. 1 except that the differential capacitor of the first illustrative embodiment has been replaced by a pair of capacitors: a fixed capacitor 163 one plate of which is electrically connected to the reference voltage circuit 52 and the other plate of which is electrically connected to the lead 33 of the flow signal circuit 39, and a variable capacitor 165 having one plate connected to the reference voltage circuit 52 and the other plate connected to the lead 37 of the flow signal output circuit 39. The relative amount of in-phase signal imposed on each electrode is then determined by adjusting the variable capacitor 165. The fixed capacitor 163 may conveniently have a capacitance of 2.3 pf. and the variable capacitor 165 may be variable in the range 2.3± pf.

Figure 3:
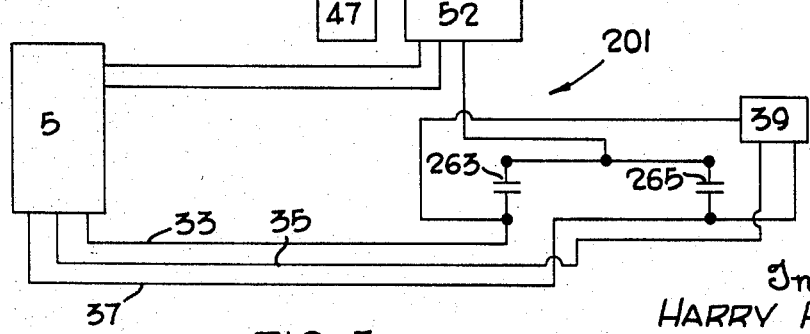
FIG. 3 is a circuit diagram of another illustrative embodiment of flow meter of this invention.

A third embodiment of flow meter of this invention is shown in FIG. 3. This embodiment 201 is identical with that shown in FIG. 2 except that both capacitors 263 and 265 corresponding to capacitors 163 and 165 of the second embodiment are of fixed value. The values of the capacitors are chosen for each meter by experiment. Although this embodiment lacks the virtue of being adjustable in the field to accommodate errors caused by the installation, it has the advantage of being tamperproof.

Numerous variations in the flow meter of this invention, within the scope of the appended claims, will occur to those skilled in the art in the light of the foregoing disclosure.

Having thus described the invention, what is claimed and desired to be secured by Letters Patent is:

I claim:
1. In a magnetic flow meter comprising:
   1. a conduit adapted to carry fluid,
   2. an activating circuit for generating an alternating magnetic field across said conduit, said activating circuit comprising an electromagnet adjacent said conduit,
   3. a flow signal output circuit for detecting a potential created by flow of said fluid through said magnetic field, said flow signal output circuit comprising a pair of electrodes positioned on opposite sides of said conduit; and
   4. a reference circuit comprising a transformer secondary coupled to said activating circuit, wherein unwanted signals are generated in the flow meter, said unwanted signals having a component in phase with said potential created by the flow of said fluid, the improvement comprising means for cancelling said in-phase component of said unwanted signal, said means comprising a capacitor, a first plate of said capacitor being electrically connected to said reference circuit and a second plate of said capacitor being electrically connected to said flow signal output circuit to impose on said flow signal output circuit a cancelling potential in phase with said potential created by the flow of said fluid.

2. The improvement of claim 1 wherein said capacitor is a differential capacitor, said first plate is movable, said second plate is electrically connected to one of said electrodes and a third plate of said capacitor is electrically connected to the other of said electrodes.

3. The improvement of claim 2 wherein said flow signal output circuit further comprises a pair of electrode loops, one of said electrode loops being electrically connected to one of said electrodes and the other of said electrode loops being electrically connected to the other of said electrodes, each of said electrode loops comprising a potentiometer, said second plate being electrically connected to a wiper of one of said potentiometers and said third plate being electrically connected to a wiper of the other of said potentiometers.

4. The improvement of claim 1 including a second capacitor, a first plate of said second capacitor being electrically connected to said reference voltage circuit; said second plate of said first capacitor being electrically connected to one of said electrodes and a second plate of said second capacitor being electrically connected to the other of said electrodes.

5. The improvement of claim 4 wherein said first capacitor is variable.

6. The improvement of claim 4 wherein said flow signal output circuit further comprises a pair of electrode loops, one of said electrode loops being electrically connected to one of said electrodes and the other of said electrode loops being electrically connected to the other of said electrodes, each of said electrode loops comprising a potentiometer, said second plate of said first capacitor being electrically connected to a wiper of one of said potentiometers and said second plate of said second capacitor being electrically connected to a wiper of the other of said potentiometers.

7. The improvement of claim 6 wherein said first capacitor is variable.

8. The improvement of claim 1 wherein said flow meter includes a primary unit and a secondary unit, said primary unit comprising said conduit, said electromagnet, said electrodes, said transformer secondary, and said means for cancelling said in-phase component.

9. In a magnetic flow meter comprising conduit means for carrying a fluid, electromagnetic means for forming an alternating magnetic field across said conduit means, and an output circuit comprising a pair of electrodes adapted to detect an alternating potential created by a fluid flowing in said conduit through said magnetic field, the improvement comprising means for cancelling unwanted signals in phase with said alternating potential created by said fluid flowing in said conduit means, comprising a variable capacitor, a first plate of said capacitor being connected to a source of alternating current having a potential in quadrature with said alternating potential created by said fluid flowing in said conduit means and a second plate of said capacitor being electrically connected to said output circuit, to impose on said output circuit a cancelling signal in phase with said potential created by said fluid flowing in said conduit, the amplitude of said cancelling signal being variable by adjusting said variable capacitor.

10. In a magnetic flow meter having a primary unit and a separate secondary unit, said primary unit comprising:
1. a conduit adapted to carry flowing fluid,
2. an electromagnet adjacent said conduit, said electromagnet being fed by a source of alternating current; and
3. a flow signal output circuit electrically connected to said secondary unit, said flow signal output circuit comprising a pair of electrodes in said conduit, for detecting a potential created by a fluid flowing in said conduit adjacent said electromagnet, wherein unwanted signals having a component in phase with said potential created by said fluid flowing in said conduit are produced, the improvement comprising means in said primary unit for cancelling said in-phase component of said unwanted signal comprising a variable capacitor in said primary unit, one plate of said capacitor being electrically connected to said flow signal output circuit and another plate of said capacitor being connected to a source of alternating current having a potential in quadrature with said alternating potential created by said fluid flowing in said conduit to impose on said output circuit a cancelling signal in phase with said potential created by said fluid flowing in said conduit, the amplitude of said cancelling signal being variable by adjusting said variable capacitor.